US006203653B1

(12) United States Patent
Seidner

(10) Patent No.: US 6,203,653 B1
(45) Date of Patent: *Mar. 20, 2001

(54) METHOD OF MAKING ENGINEERED MOULDINGS

(76) Inventor: Marc A. Seidner, 234 Conway Ave., Los Angeles, CA (US) 90024

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/718,100

(22) Filed: Sep. 18, 1996

(51) Int. Cl.$^{7}$ .............................. B32B 21/14; B32B 31/00

(52) U.S. Cl. .......................... 156/268; 156/250; 156/267; 156/299; 144/350; 144/345; 144/346; 144/355; 144/344; 52/455

(58) Field of Search ..................................... 156/268, 267, 156/257, 259, 250, 299, 300; 144/350, 345, 346, 355, 344; 52/455; 428/45

(56) References Cited

U.S. PATENT DOCUMENTS

| | | | | |
|---|---|---|---|---|
| 3,476,630 | * | 11/1969 | Viol et al. | 156/268 |
| 4,111,247 | * | 9/1978 | Hasenwinkle | 144/350 |
| 4,619,800 | * | 10/1986 | Santo | 156/268 |
| 4,643,237 | | 2/1987 | Rosa | 144/369 |
| 4,726,973 | * | 2/1988 | Thompson | 428/45 |
| 5,074,092 | * | 12/1991 | Norlander | 52/455 |
| 5,546,715 | | 8/1996 | Edstrom | 52/215 |
| 5,665,190 | * | 9/1997 | Sansano Sanz | 156/268 |

FOREIGN PATENT DOCUMENTS

| | | |
|---|---|---|
| 175877 | 10/1906 | (DE) . |
| 4204675 | 8/1993 | (DE) . |
| 605065 | 5/1926 | (FR) . |
| 1295269 | 4/1962 | (FR) . |
| 2624781 | 6/1989 | (FR) . |
| 607213 | 8/1948 | (GB) . |

OTHER PUBLICATIONS

European Search Report, Publication No. WO 98/41371, Sep. 24, 1998. PCT Written Opinion dated Dec. 18, 1998.

Working in Wood, pp. 238–239, Library of Congress Catalog Card No. 80–81148 ISBN 0–399–12550–7, 1980.*

*Wood*, Better Homes & Gardens, Jan. 1991, Issue No. 40, Publisher William Reed, pp. 38–41.*

* cited by examiner

*Primary Examiner*—Linda L. Gray
(74) *Attorney, Agent, or Firm*—Pretty & Schroeder

(57) ABSTRACT

A technique for forming a contoured axially extending engineered moulding that has at least one axially extending exposed surface. The technique includes providing an elongated outer wood section. A substrate having at least one axially extending side is provided. The wood section is adhered to the axially extending side. The wood section is contoured uniformly in an axial direction to form the exposed surface. A preferred embodiment uses a reengineered rip saw to contour the piece of wood. It is also assumed that multiple moldings can be machined by the reengineered rip saw simultaneously. The simultaneous machining by the reengineered rip saw also permits simultaneous measurements and simultaneous cross cutting and dado cutting of the moldings.

20 Claims, 6 Drawing Sheets

FIG. 1
PRIOR ART
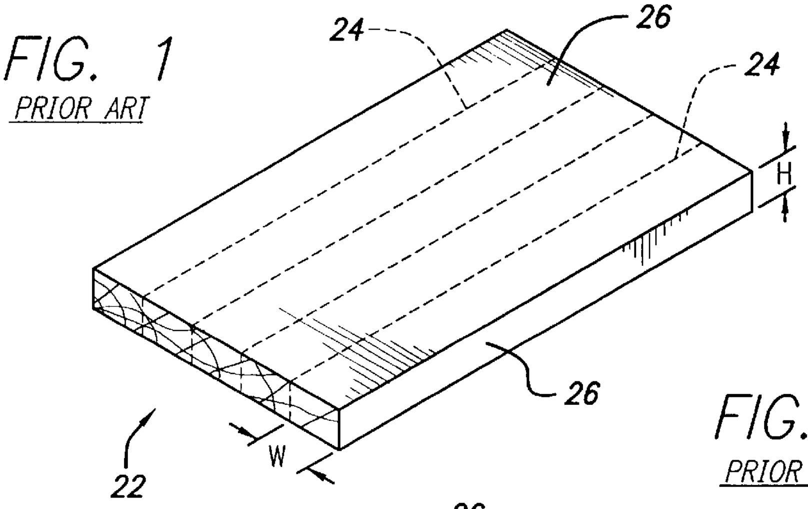
FIG. 2
PRIOR ART
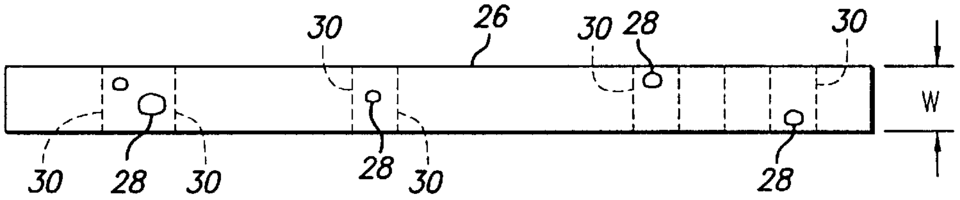
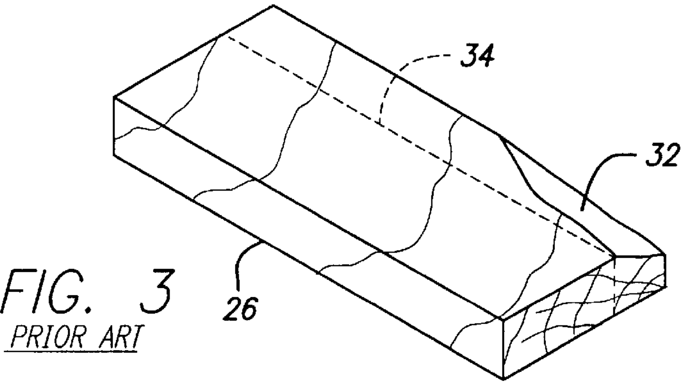
FIG. 3
PRIOR ART
FIG. 4A
PRIOR ART
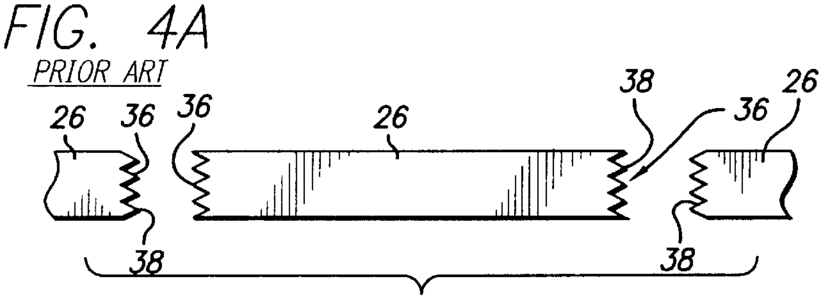
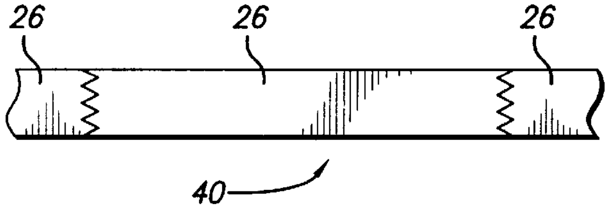
FIG. 4B
PRIOR ART FIG. 5
PRIOR ART
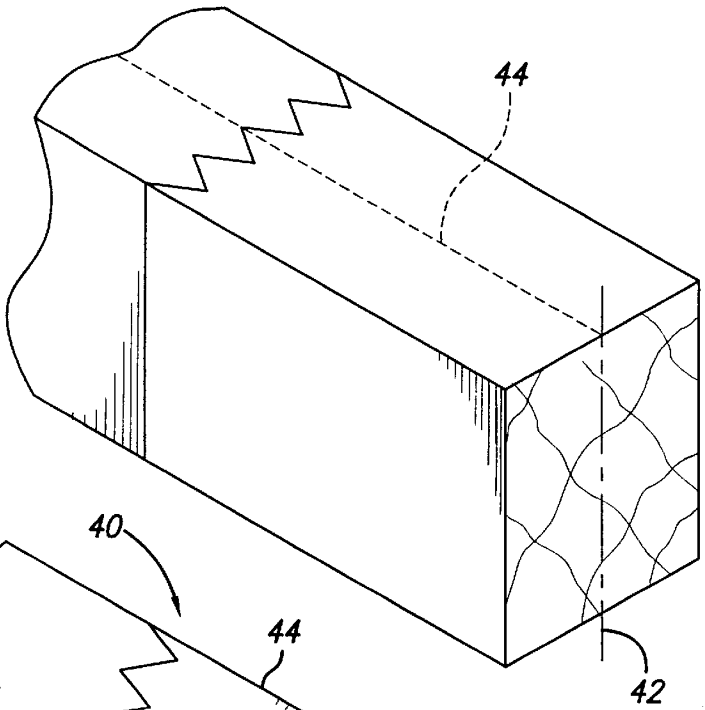
FIG. 6
PRIOR ART
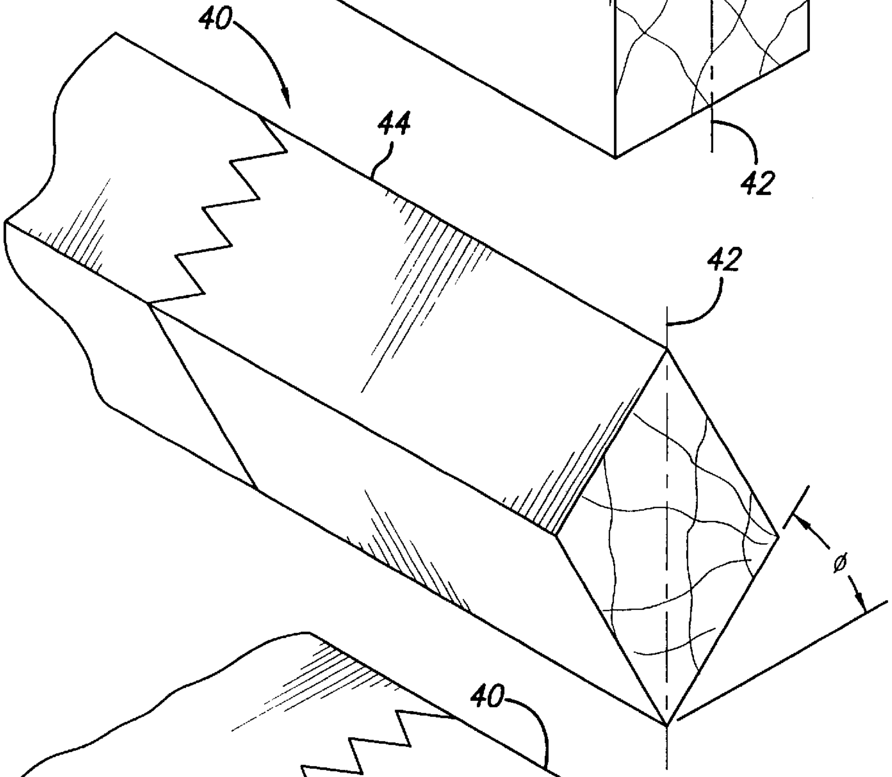
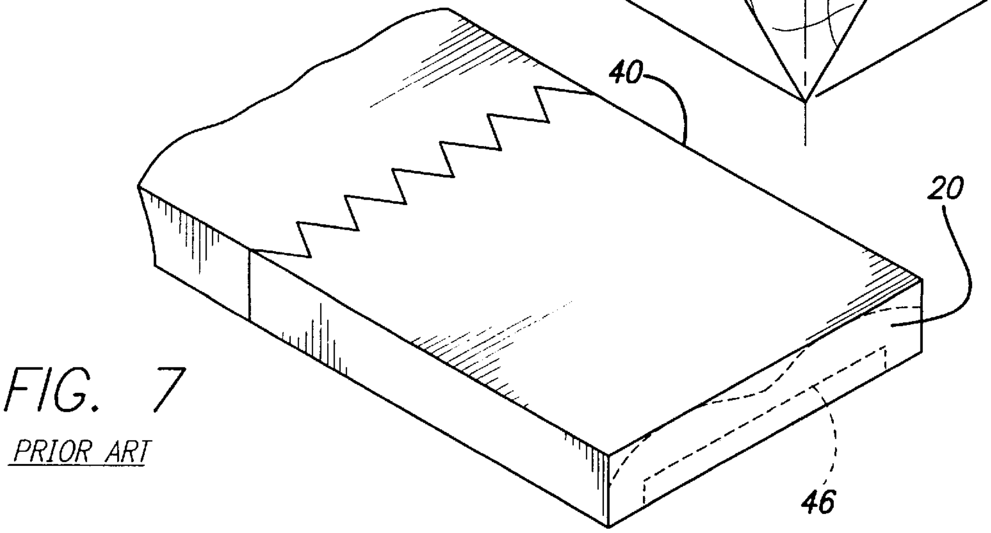
FIG. 7
PRIOR ART

METHOD OF MAKING ENGINEERED MOULDINGS

BACKGROUND OF THE INVENTION

The present invention relates to wooden blanks and mouldings, and more particularly to mouldings that have substrates covered by a machinable wooden veneer. A reengineered rip saw as described herein preferably is used to form a plurality of lineal mouldings in parallel simultaneously.

The use of mouldings such as base (floorboard skirting), flat and split door jambs, crown (ceiling surrounds), rabbeted jambs (frames), brick mould, and casing (door and window surrounds), are well known. Mouldings generally are decorative, and provide architectural detail. Some mouldings, however, support light loads such as door jambs that support the hinges and doors. It is important that the wood used in the mouldings be of at least a quality corresponding to the type of finish use desired, and the type of load supported. For example, if the mouldings are to be left natural or varnished, then the wood is usually desired to be clear and bright, free of knots, fungus stains, pitch, wood discolerations, glued joints, or other visible blemishes. Such mouldings are known in the construction business as "clear solid grade lineal mouldings," or simply "solid clear mouldings."

Mouldings intended to be covered by paint (or something else that hides the glue joint, color, grain or defect of the wood) are known as paint grade mouldings. The construction industry uses paint grade mouldings in most applications. Using a lower grade knotty or defective or discolored woods, or otherwise imperfect wood, in the fabrication of paint grade mouldings is especially desirable considering that higher quality clear and bright grade woods are generally less plentiful and more expensive. Lower grade woods are less expensive than solid clear mouldings, and the finger joint manufacturing process involved in the fabrication of paint grade mouldings, removes defects that are unpaintable in finished mouldings. The use of paint grade moulding results in a lower cost of the finished moulding applications because long clear bright lengths of natural finished wood are not required. In recent years, the use of clear solid grade mouldings has declined while the use of paint grade mouldings has become more common.

Finger joint moulding is produced using a fifty year old process created to provide paint grade moulding in desired dimensions. Each finger joint moulding is formed by a lengthy multi-step process that includes: 1) ripping strips from a thick plank of wood, 2) cross cutting blocks of paintable and finger-jointable defect-free segments out of each strip by removing those segments having knots, splits, blemishes, or other defects, 3) occasionally reripping the cut blocks strips to a narrower width to remove any broken or wane edges, 4) finger jointing by machining and glueing the resulting accumulated clear blocks to form finger joint blanks of the desired length and dimension, 5) resawing if necessary, with a band saw or rip saw the finger joint blanks in a desired dimension or beveled shape, 6) passing the resulting blank through a multi-headed profiled knife moulder in lineal fashion to form mouldings in their final cross sectional contoured shape, and 7) precision trimming and dado processing the mouldings into the final desired lengths of the moulding. The typical remaining steps for finger joint moulding processing, before shipping, are occasional sanding or patching, priming or painting, and packaging.

Though finger joint moulding is a widely accepted and used paint grade moulding, there are several undesirable characteristics associated with the prior art techniques used to manufacture finger joint mouldings. First, the production of finger joint mouldings is slow, labor intensive, and generates much wood waste. Even with skilled craftsmen and modem machines, approximately 45 to 50 percent cumulatively of the original wood volume used is lost (as sawdust, shavings, and defect blocks) during the many processing stages. The entire board footage volume of finished finger joint moulding profiles fabricated is constituted by an equivilent volume of high quality clear solid wood. The lumber materials used in the fabrication of finger joint moulding are expensive and of limited availability. The finished product being formed from solid bright clear wood is likewise expensive and in limited supply.

Second, each discrete section of wood or blank used in finger joint moulding is composed from multiple smaller blocks or discrete wood sections. Therefore, each discrete wood section is susceptible to its own natural characteristic tendencies of warping, splitting, bowing, cupping, twisting, and other problems common to other discrete lengths of wood. Wood moulding that warps, cracks, or otherwise distorts is difficult and frustrating to work with, and increases scrap. Additional unpredictable waste is generated during the manufacturing process. If the process exposes a defect previously hidden inside the wood and it becomes apparent that a section or block is defective in that manner after it is fabricated into a blank, it can usually result in the entire blank being deemed defective and subject to complete remanufacture to remove such newly apparent defects.

A third undesirable characteristic of prior art finger joint mouldings, shared with other paint grade mouldings and varnish grade mouldings, is that each moulding piece usually has to be moulded separately. Rarely are more than two pieces machined simultaneously in one moulding machine, and two pieces may be machined simultaneously only when the profile has a very small cross sectional dimension as most moulders are not wider than eight inches, and all moulders are not wider than twelve inches. Machining one or two work-pieces at a time (especially when using modern and expensive moulders) is costly in both machine time and labor costs. Such slow, individual, work processing adds to the expense of the moulding significantly and usually results in smaller mouldings being only slightly less costly than mouldings having larger cross sections, or solid clear grade lineal mouldings formed from higher quality wood. Since each moulding piece is moulded separately and since cross cutting is a separate operation, each piece also has to be handled, measured, and cross cut by itself.

Other mouldings are formed as substrates that have veneers covering some or all of their surfaces. Veneers are much more common in furniture component construction than in moulding fabrication. In prior art veneer mouldings, an inexpensive substrate of wood, or other material such as medium density fiberboard, is machined or formed in a quality fashion to the desired shape of the final moulding. A thin strip of veneer (usually cut or sliced from a high quality wood) is then bent or contoured in a shape that conforms directly to the surface of the substrate. The veneer is then adhered to the exposed surfaces of the substrate. If done correctly, veneer mouldings can have an attractive appearance resembling, but being less costly than, solid clear wood mouldings. Veneer moulding is more expensive than finger joint paint grade mouldings. The use of veneer moldings is usually commercially reserved to low volumes of high quality expensive veneer hardwood species where solid wood of that species is difficult or too costly to obtain.

Present veneer mouldings have several shortcomings, however. To form a thin veneer into certain generally commercial standard industry household moulding profiles or desired angles or shapes, the veneer has to be bent sharply to conform to sharply angled contours of the profile. Most veneers are formed from a wood that cannot adapt to very sharp bending, and attempting to bend them sharply causes cracking. Such cracking may occur after the moulding leaves the factory, and perhaps during installation of the moulding. However, most cracking occurs in manufacturing. Sharp angles are therefore not usually found on veneered mouldings. In addition, the adhesive used to attach the veneer to the substrate may fail, allowing the veneer to peel away. The use of veneer mouldings is not very desirable, for most of the large volume of mouldings consumed, because of these cracking and peeling problems. Furthermore, veneer mouldings are still expensive and require a careful machining of the substrate in a linear fashion before the application of the veneer that is also accomplished in a linear fashion. To the trade, veneer mouldings often do not have the appearance of a solid or finger joint wood, and are often equated with either lower valued casegood products or furniture, cabinets, and picture frames. In addition, the costs associated with acquiring veneers and veneering is relatively high.

Another consideration is the machinery that is necessary and used to produce mouldings. Moulding machines are commonly used to shape contoured lineal surfaces of the mouldings. Moulding machines are rarely able to produce a moulding or process a blank that is a foot wide or wider. The moulding machines are relied upon largely because they can provide cuts having extremely close tolerances and/or complex curves. If mouldings are milled by machines that do not operate within these tolerances, then certain ones of the edges of the work piece may be misshaped, the exposed wood of the mouldings may have raised or torn grains, or the lineal surfaces may have washboard surface effects. Further machining, or occasionally sanding, is necessary to smooth the surfaces of work pieces having such washboard surfaces. Many times it is simply impossible to repair the surface and the entire product must be scrapped. Other prior art machines usually do not produce mouldings that are as attractive as mouldings produced by moulding machines. Moulding machines require complex engineering and tooling. The moulding machines are individually built by hand and require precise tolerances in the machine and tool steel used. Therefore, they are relatively expensive to purchase. Operating moulding machines requires a high degree of skill and the maintenance is expensive and technically burdensome.

Another type of machine used in the process of fabrication of mouldings are planer or matchers. These are primarily used to plane or smooth the outer surface of lumber or a blank in a lineal manner. It is impossible to cut through a piece of wood to form multiple separate lineal mouldings from a single piece of wood using a planar. Planers are less expensive to buy and operate than moulders that have similar board footage throughput capabilities, but can only perform a limited function.

Rip saws are also used in moulding fabrication to provide cuts that extend lineally through pieces of wood. Rip saw cuts do not have to generate much wood waste. However, forming curved or contoured lineal surfaces using rip saws is not possible. From these foregoing paragraphs, it should be evident that each of the moulders, planers, and rip saws have their own purpose in moulding fabrication. Not only does each prior art piece of machinery work on very few pieces at any one time (in a lineal fashion). Additionally, to form many mouldings, there are multiple necessary processing steps that often require different machines.

In a certain prior art system, where work pieces that have edge-glued panels or lamenated substrate panels machined into a panel or moulding having finished contoured edges or surfaces, the product is produced by machining, using routers as cutting tools which move about the work piece while maintaining the work piece in that fixed location. An example of a machine that cuts in this manner is a computerized numerical control routing machine. Such routers are usually limited to a maximum of four or five routing heads working simultaneously on one work piece. Such computerized numerical control systems are complex to program, expensive to purchase, and typically machine large surface areas relatively slowly. They are not a practical alternative to moulding machines.

The greatest volumes of mouldings sold are standardized profile shapes and sizes that have a simple but well defined contoured cross section. These rectangular cross sectional rounded edges and simple "S" edges and radius curved cross sectional mouldings represent approximately 85 percent of the mouldings sold. Intricately curved and angled cross sectional mouldings and very complex profiles traditionally represent approximately 15 percent of moulding volume. Many prior art machines used to produce mouldings therefore are more complex, and can provide profiles of much greater intricate architectural detail and variations in design, than is necessary for the predominant volume of mouldings made and consumed by the housing and commercial construction industry.

Reducing the costs of machinery, labor, and the bulk of the raw material consumed in moulding production, and yet providing a technique for producing mouldings formed from multiple wood sections with a high quality appearance, is highly desirable. Limiting the percentage of high quality wood contained within such mouldings, and the waste associated with producing such mouldings, is also desirable. Replacing such high quality woods with lower quality woods, wood substitutes, or other materials is desirable where such replacement does not detract from the appearance sought or the properties necessary for use of the mouldings. Production of a veneered moulding that appears as if it were solid wood and permits the machining of sharp cross sectional curves and angles on the contoured profile is also desirable. It is desirable to make it difficult to distinguish a veneered mouldings from other conventional solid wood mouldings based upon surface appearance alone. It is desirable to provide a machine that is not extremely complex to operate and maintain and of lower cost to buy than a conventional moulder which can inexpensively mill the wood into high quality mouldings with close cross sectional tolerances and do so in volume. It is also desirable to provide a machine that can profile multiple lineal mouldings simultaneously at regular moulder feed speeds. The present invention satisfies these desired features using relatively uncomplicated technology.

SUMMARY OF THE INVENTION

The present inventions relate to a technique for forming an axially extending engineered lineal moulding that has at least one axially extending exposed surface. An elongated wood section, and a substrate having at least one axially extending side, is provided. The wood section is adhered to the axially extending side. The wood section is contoured by moulding in a lineal manner, in an axial direction, to form, shape, and angle the exposed surface.

A feature of certain preferred embodiments of the present invention is that the substrate itself (that may be relatively inexpensive to fabricate) can replace and substitute for a large volume of the relatively expensive solid wood used in solid clear or finger joint mouldings. The substrate is preferably taken from a material that can limit common solid wood moulding problems (or finger joint moulding problems) such as splitting, twisting, and warping. Since the wood forms an exposed outer surface of the engineered blank that may be contoured, the appearance and the longevity of the engineered moulding of the present invention is superior to traditional veneer mouldings, and resembles for all appearance purposes either solid wood clear mouldings or solid wood finger joint paint grade mouldings.

Another feature of the preferred embodiments of the present invention is to provide a reengineered and profiled wide plane multiple rip saw that can inexpensively, simultaneously, and yet accurately, form many multiple profiles of the mouldings. The prior art moulding machines are replaced by those reengineered rip saws that are comparatively inexpensive to build and operate. Importantly, the reengineered wide plane rip saw can accurately machine multiple pieces of mouldings simultaneously in a lineal fashion and at a high speed from a single blank form, unlike prior art moulders. The reengineered rip saw of preferred embodiments of the present invention, has upper and lower arbors that hold cutter tool elements that are capable of providing continual, concentric, and smooth profile cuts that both separate multiple profiles of the distinct engineered mouldings from said composite panel form, and contour the engineered moulding surfaces as the workpiece panel passes into and through the machine. The reengineered rip saw has additional guides and restraints to hold the composite panel moulding blanks and finished exiting mouldings in a manner that allows exact tolerances to be held.

Other features and advantages of the invention should become apparent from the following detailed description of the invention taken in conjunction with the accompanying drawings, which illustrate, by way of example, the principles of the invention.

BRIEF DESCRIPTION OF THE DRAWING

FIG. 1 is perspective view of a board or plank of 8' to 16' length used to form a prior art finger joint moulding;

FIG. 2 is a plan view of a rip strip cut from the FIG. 1 plank;

FIG. 3 is a perspective view of a prior art block cut from a rip strip but having a broken or waney edge;

FIG. 4A is a top or side assembly view of a plurality of prior art rip strips having finger jointed cut ends;

FIG. 4B is a top or side assembled view of the FIG. 4A prior art rip strips connected by glue in an end-to-end configuration;

FIG. 5 is an end perspective view illustrating using a band saw to form prior art straight finger joint blanks from other finger joint blanks;

FIG. 6 is an end perspective view illustrating using a band saw to form prior art angled finger joint blanks from other larger finger joint blanks;

FIG. 7 is a perspective view illustrating a prior art angled finger joint blank, the blank has an outline formed thereupon that defines the final cross sectional shape of the finger joint moulding;

DETAILED DESCRIPTION OF THE PRESENT INVENTION

Figure 8A:
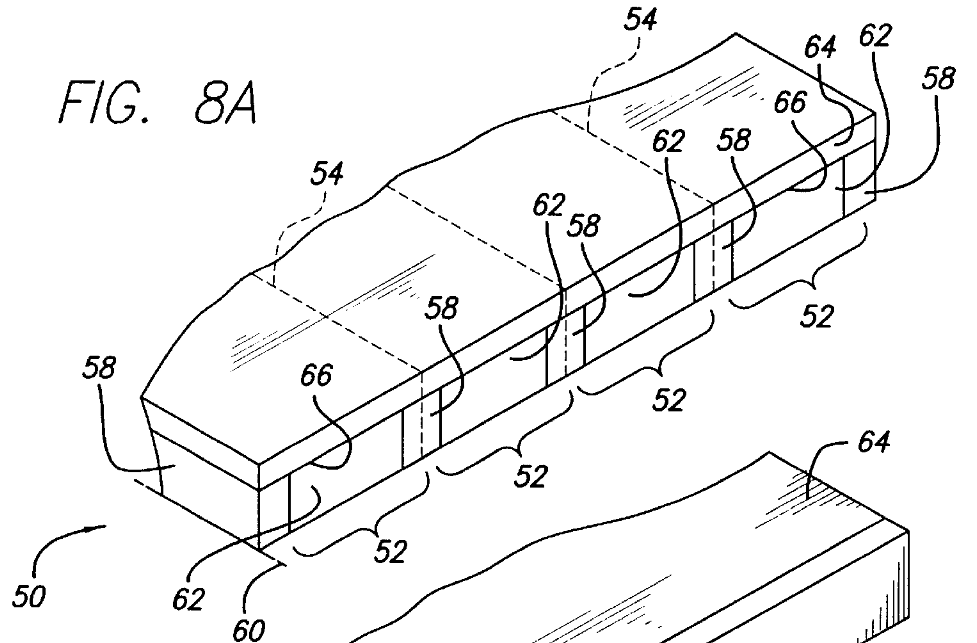
FIG. 8A is perspective view of one embodiment of an axially extending composite panel form, used to form one type of engineered moulding.

In this disclosure, elements of different embodiments having similar structures that function similarly may be provided with the same reference number. In this disclosure, all measurements and materials are for illustrative purposes only, and are not intended to be limiting in scope. In this disclosure, the term "engineered" is defined as any element, such as a blank or a moulding, that is formed from a plurality of distinct elements affixed to each other in a specially conceived manner designed for finished appearance. In this disclosure, the term "reengineered rip saw" is defined as a rip saw having at least one cutting element that functions as a combination moulder knife and saw blade that can contour wood, and at least one cutting element that functions as a saw blade or splitter knife that can cut wood. Both types of cutting elements are mounted to at least one of its arbors.

Finger Joint Moulding

To understand this invention properly, beginning with a more detailed understanding of the prior art is helpful. FIGS. 1–7 thus illustrates a prior art process for producing finger joint mouldings. This process begins with a board or plank 22 illustrated in FIG. 1. The board has a height H that is greater than the maximum height of the finger joint moulding blank from which a moulding is being formed (often H=1⁵⁄₁₆" or 1⁹⁄₁₆"). The board 22 is cut lengthwise along lines 24, using a rip saw, to form a plurality of rip strips 26. A width W between the lines 24 is greater than the maximum width of a blank needed to produce the finger joint moulding being formed (often W=2⅜", 3⅜", or 4⅞"). FIG. 2 illustrates a plan view of one such rip strip. Many rip strips contain one or more knots 28 or other imperfections. Cross cuts along lines 30, as close as possible to the knots or other defects as shown in FIG. 2, are used to remove the defects that are not useable in finger joint moulding. The positioning of the cut lines 30 must be chosen skillfully since, if the cut lines are too far from the defect, good wood is wasted. If the cut lines are too close together, then portions of the imperfection remain in the wood. Also, the cuts must be perpendicular to the axis of each rip strip to produce rectangular blocks with square cut ends so that finger joint blanks which are supposed to be straight are made from less wood, and less wood is lost in the finger joint moulding fabrication process.

While cutting the rip strip 26 along cut lines 30, the edges of some boards where tree bark was attached are waney or broken 32 as shown in FIG. 3. Typically, many ripped boards are not perfectly square-edged and have at least one waney edge. To remove the waney edge, the block cut from that portion of the rip strip is re-ripped (recut) along dotted lines 34 as illustrated in FIG. 3. This process of re-ripping the rip strips to remove the broken edges must be done carefully since, if too much wood is removed, the excess wood is wasted. If too little wood is removed, then many rip strips still have a portion formed with a waney edge. Such blocks are not suitable for further machining into finger joint mouldings of the original rip width, and using rip strips with waney edges can result in defective mouldings or a higher percentage of waste.

To form particular moulding blank segments of a desired length from shorter segments, multiple shorter blocks have to be attached to each other in an end to end configuration. To join these blocks, ends 36 of the blocks 26 are cut with finger cut patterns 38 as illustrated in FIG. 4A. The finger cut patterns of mating fingered ends have to mate tightly and gap-free with each other so that the ends can be connected to form a finger joint blank 40, illustrated in FIG. 4B. Each block used to form the finger joint blank must have a uniform thickness and width to ensure a sufficient quality and uniformity of the finger joint blank such that it is suitable for forming into a larger finger joint moulding.

The finger joint blank forms a continual elongated element that must be further machined to produce a finger joint moulding. A saw (not shown), which is usually referred to as a resaw, has its blade oriented along axis 42 to cut the larger finger joint blank along the saw cut 44, in FIG. 5 and FIG. 6. FIG. 5 illustrates the saw cut where the cutting blade is parallel to an edge of the finger joint blank 40. Such cuts produce a plurality of thinner "straight" finger joint blanks having a smaller cross section than the original blank. Flat blanks are any finger joint blank having a rectangular cross section. FIG. 6 shows how the finger joint blank is tilted through an angle θ, such that the resaw saw cut is not parallel to any face of the finger joint blank but is on a bevel. A jig or apparatus called a "tilting bed", that is fixed with normal saw infeed rollers (not illustrated) secures the finger joint blank in the tilted position during the resawing process. The FIG. 6 configuration produces two angled finger joint blanks from a larger finger joint blank 40. An angled finger joint blank is any bevel-faced finger joint blank that is not a flat finger joint blank. The angled finger joint blanks are produced from a bevel resaw of a larger flat blank.

To provide a nearly finished finger joint moulding 20 having a cross section as illustrated in a moulding outline 46 shown in FIG. 7, the finger joint blank 40 (an angled finger joint blank is shown in FIG. 7) is fed through a moulding machine that is not illustrated, but is well known in the art. Such moulding machines vary in configuration, but in general, they cut and contour the engineered blanks with some profiled knives fixed into a rotating cutter head holding device to make continual concentric cuts which provide an elongated moulding having a uniform cross section formed from multiple lineal surfaces. The cutting surfaces of the knife blades of the moulding machine cutter head form the outside surface shape of the moulding outline 46. These moulding machines and cutter heads are expensive to purchase, maintain, and operate. The moulding machines produce mouldings lineally, generally singularly, and therefore relatively slowly. Each moulding piece that is being cross cut or trimmed to a desired length therefore has to be measured, handled, and cut individually. The finger joint moulding thus provided need not be sanded unless improperly made, but may be painted, and prepared for mounting.

Considerable wood is wasted during the many steps in the production of finger joint blanks. In addition, naturally a large amount of costly high quality solid wood fiber remains within the finished finger joint moulding as the body and the substance of the moulding compared with the techniques of the preferred embodiment of the present invention illustrated in FIGS. 8 to 13, and described below. Finger joint mouldings generally suffer from essentially the same defects as mouldings formed from a single piece of solid wood and as such are susceptible to warping, cupping, bowing, twisting, and splitting, but to a lesser degree. Finger joint moulding tends to be much more stable than the single-piece mouldings.

Now having described the prior art finger joint moulding production process in detail, certain preferred embodiments of the present invention, illustrated in FIGS. 8–16, are now described in detail.

Composite Panel Form

Figure 9:
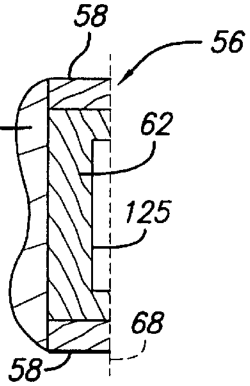
FIG. 9 is an end view of one embodiment of an engineered moulding that can be produced from the FIG. 8A composite panel form.

FIG. 8A illustrates an axially extending composite panel form 50 composed of solid wood and/or finger joint wood elements, and a wood or engineered wood substrate, or a composite wood substrate formed of other man made materials. The composite panel form is cut along one or more cut lines 54 to form an assembled plurality of engineered blanks 52 that can be further machined, to form a completed engineered moulding 56 as illustrated in FIG. 9. The cutting along the cut lines 54 can occur simultaneously with the forming of the contoured surfaces in the preferred embodiment as described later. The axially extending composite panel form 50 is generally oriented parallel to an axial direction 60 that is also the direction that the composite panel form is cut along. The composite panel form is fabricated from axially extending edge boards 58, a plurality of axially elongated substrates or cores (hereinafter called "substrates") 62, and a machinable veneer layer (hereinafter called "machinable veneer") 64. The machinable veneer may be formed from sliced or rotary veneer but the preferred embodiment is a high grade wood finger joint blank, planed, and sliced thinly or resawed into thin flat blanks of a preferred dimension and thickness.

Figure 8B:
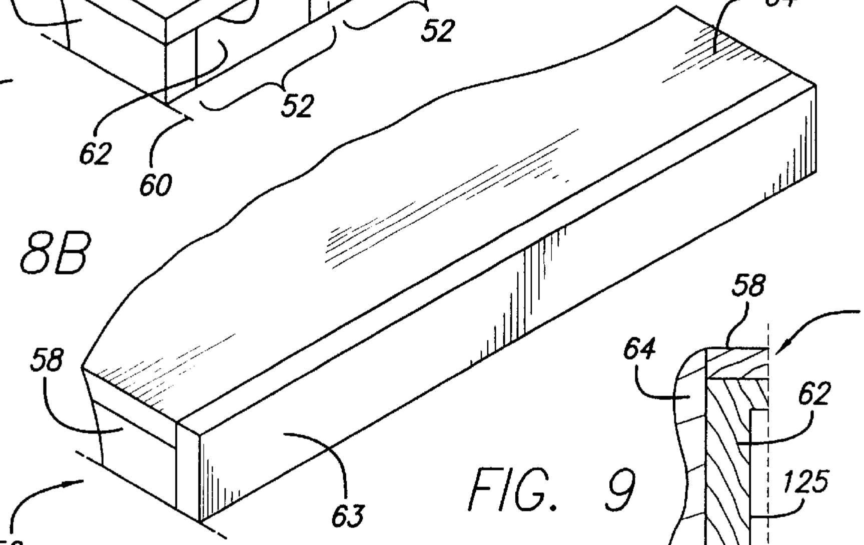
FIG. 8B is a perspective view of an alternate embodiment of composite panel form used to form another type of engineered moulding.

There are a variety of engineered mouldings that can be formed from different embodiments of composite panel forms that are within the concepts of the present invention. The composite panel forms are generally much wider than a foot, and may be as wide as five feet. FIG. 8B illustrates an alternate embodiment of composite panel form that comprises only one solid substrate 62 (not illustrated), two edge boards 58 positioned on either lateral side of the substrate, one machinable veneer layer 64 attached to the top of the substrate, and two end boards 63 positioned on either end of the substrate. The FIG. 8B composite panel form may be used to form such engineered mouldings as window sills, drawer fronts, panels, door panels, cabinet panels, and any other moulding configuration where it is desired to surround the substrate on five sides. Considering FIGS. 8A and 8B, it should be evident that the desired configuration of the composite panel forms depends largely upon the final intended shape of the engineered moulding(s) that are being produced by the composite panel form, and from which angles such engineered mouldings are likely to be viewed when mounted.

In most prior art veneer mouldings, the thin veneer lies on a substrate surface that has previously been roughly shaped. The machinable veneers of the preferred embodiments of the present invention are of a suitable thickness, being thick enough to allow contouring of the machinable veneer itself to a desired depth while not contouring into the substrate. The machinable veneers themselves are machined similarly to, and have similar machining characteristics to, the wood of normal finger jointed blank. The axially extending edge boards 58 are interspaced with, and adhere to, the substrates using a glue or resin. The axis of the axially extending edge board is parallel to the axis of the substrates, and both axes are parallel to the axial direction 60. A substantially planer upper surface 66 is formed from the axially extending edge boards 58 and the substrates 62. The machinable veneer 64 is bonded with a glue or resin to the upper substrate surface 66, so that the machinable veneer overlays nearly all of the axially extending board 58 and substrates 62. The machinable veneer may be formed as a single strip or more likely as a plurality of parallel strips abutted in an edge-to-edge configuration, depending upon the size of the composite panel form, and the dimensions of the available lumber.

Part of the substrate contacts surface 68 such as a wall, floor, etc. (See FIG. 9) when the engineered moulding is mounted in position. If desired in the profiled shape, or if customary in the trade profiles, a back out 125 is formed in the back side of the substrate. The back out is similar to known prior art in mouldings, and provides a stress-reduction configuration and providing a location for loose pieces of wall board, tape, etc. to be located during mounting the moulding that would otherwise limit mounting the moulding flush relative to the mounting surface 68.

The three elements of the engineered blank 52 that are visible in the mounted final engineered moulding 56 (secured to a wall, etc.) are the edge boards 58, the machinable veneer 64, and the end boards 63 if one exists. These elements may be viewed as forming a channel in which the substrate is located. The wood forming the channel is machined, or contoured, by the reengineered rip saw to form any visible contouring in the finished and mounted mouldings. The substrate 62 is not formed from the same material as the machinable veneer. The substrate is formed from a material selected based upon its structural characteristics and low cost, not its appearance. Preferred characteristics of the substrate include being less expensive, more readily available, structurally stronger, more resistant to distortion or warping, and other possible desired characteristic such as including an enhanced fire retardant, compared with the wood of the machinable veneer or the edge boards. Alternately, depending upon the application of the moulding, the substrate may be formed to be extremely light or very dense, and structural or not. Such materials as lumber core, particle board, laminated veneer lumber (L.V.L.), medium density fiberboard (M.D.F.), hardboard, composite mineral core board, or oriented strand board (O.S.B.) are very satisfactory substrates. The substrates may even be formed from other materials such as plastics, firm or rigid foam (polystyrenes, expanded PVCs, and other types) reconstituted recycled materials, or a combination of the materials of the types described in this paragraph. The substrate is typically not visible when the engineered moulding is secured in position. However, the substrate should be selected for its functionality, including such traits as stability, consistency, weight, ease of machinability, availability, and low cost.

One consideration when viewing FIGS. 8A and 9 is that multiple engineered blanks 52 (or the associated engineered mouldings 56) can be simultaneously formed from a single wide composite panel form. In addition, much of the contouring and profiling of each of the engineered blanks 52 into desired engineered mouldings 56 can occur simultaneously, as well. This application of simultaneous processing, or parallelism in machining moulding elements, represents a major advantage that can be achieved with the present invention. The advantages become apparent when considering that the cost and use of moulders represent a major expense in moulding mills and that considerable machine time is required to fabricate each lineal length piece of finger joint moulding 22.

In a preferred embodiment of the present invention, a reengineered rip saw described below can perform this simultaneous cutting, contouring, and profiling. Rip saws are designed to cut generally parallel to the wood grains using saw blades as the work piece passes through the machine-driven rotating saw. Lineal mouldings produced in any manner are cut in a direction parallel to the wood grains. In the process, the cutting knife is turning in one direction concentrically while cutting into the workpiece which is moving against the direction of the cutting knife. Therefore, it is important that the wood of the axially extending edge board 58 and the machinable veneer 64 are both arranged such that their grains are parallel to the axial direction 60 of the composite panel form 50. In this manner, the rip saw (designed to cut parallel to the wood grain) can be adapted and reengineered to do a moulding function that will effectively shape the composite panel form instead of shredding the edges of the wood as would occur when the rip saw cuts into the grain of the wood. It is also possible that a standard rip saw can more efficiently and accurately cut the axially extending composite panel form 50 into multiple engineered blanks 52 of the same size, or varying sizes, and then a moulder machines each particular dimension of engineered blank 52 into engineered mouldings 56 in a similar manner as shown in, and described with reference to, FIG. 7.

Figure 10:
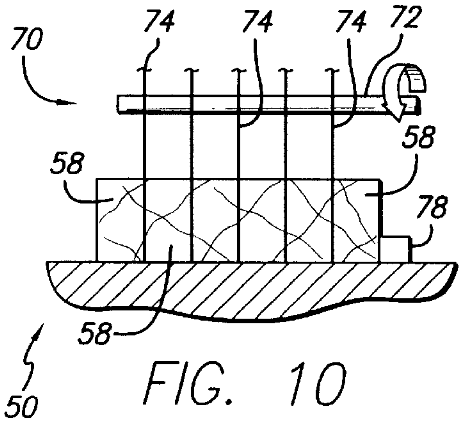
FIG. 10 is an end, partial cross sectional, view illustrating the formation of the edge boards that are applied to the FIG. 8A composite panel form.

FIG. 10 illustrates the formation of edge boards 58 integrated into the FIG. 8A composite panel form 50. While the FIGS. 10 and 11 embodiments preferably use prior art clear solid grade lineal blanks or finger joint blanks as described above, the manner in which the finger joint blanks are cut and combined to form the composite panel form of the present invention may be varied as desired. A finger joint blank, of the type referred to above as 40, is cut by a rip saw 70 that includes an arbor 72 and a plurality of rip saw blades 74 (the rip saw blades above the arbor are broken off in FIGS. 10 and 11 for ease of display). The arbor rotates about its axis. Each rip saw blade 74 is spaced from each adjacent blade by a distance corresponding to a final desired dimension of the edge board, allowing for the dimension required for the cut. A guide member 78 guides the finger joint blank along a prescribed direction within the horizontal plane during the cutting process, and roller hold down guides (not shown) provide straight tracking of the finger joint blank. The edge boards are cut to a suitable thickness whereby all of the desired machining steps may be accomplished on each edge of the engineered moulding 56. This machining includes cutting the edge board approximately in half when the axially extending composite panel form 50 is cut into multiple engineered mouldings. The edge boards should be thick enough so that the portion of the edge board that remains after cutting through a vertical plane, can concurrently be shaped to form the desired final contour of the engineered moulding. The profile will usually be machined first with the splitting or separation machining done last. However, the choice is up to the production management at the time.

Figure 11:
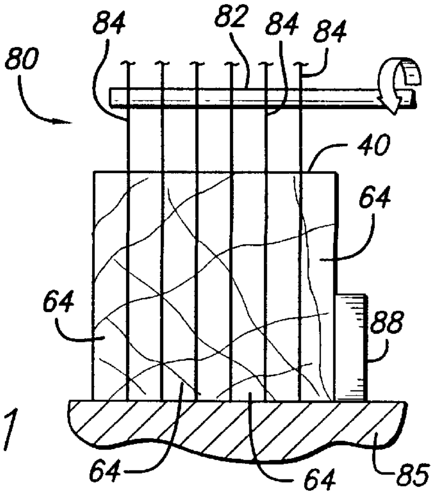
FIG. 11 is an end, partial cross sectional, view illustrating the formation of machinable veneer strips that are applied to the FIG. 8A composite panel form.

FIG. 11 illustrates one embodiment of the formation of the machinable veneers 64 that are integrated into the FIG. 8A composite panel form 50. A finger joint blank, of the type referred to above as 40 (see FIG. 5), is cut by a rip saw 80 that includes an arbor 82 and a plurality of rip saw blades 84. Each rip saw blade is spaced from an adjacent blade by a distance corresponding to maximum final desired thickness of the machinable veneer. Alternatively, a multiple saw jig type veneer saw may be used. The machinable veneers are formed from a single piece of solid lumber or a finger joint blank 40. A guide 88 for straight cutting is attached to a table 85 to guide the finger joint blank in a prescribed direction within the horizontal plane as it is being cut together with certain roller hold-down and guides (not shown). The veneer strips 64 and edge boards 58 are cut to a suitable dimension whereby all of the desired machining steps may be accomplished on each edge of the engineered moulding 56. This machining includes the cutting of the edge board approximately in half. Alternatively, monolithic rotary peeled veneers of the type that are not further shaped may be used in certain embodiments of the present invention where the outer shape of the surface of the machinable veneers facing away from the substrate, that are attached to the substrate, are the intended final shape when they are attached to the substrate. High grade thin M.D.F. may also be used as a composite veneer substitute in those instances where the outer appearance of the M.D.F. is satisfactory for the specific application.

The engineered blank of the present invention includes an engineered substrate that is preferably of uniform thickness, density and material consistency. The substrate, for example, is preferably formed from O.S.B., M.D.F., particle board, firm foam, or another material formed from compressed and bonded wood fiber overlaid in alternating different directions or engineered in a unidirectional pattern. These materials are not as susceptible to warping, twisting, cupping, bowing, and splitting as solid wood. O.S.B., particle board, and M.D.F. are largely formed from less costly wood fiber strands, chips, and wood wastes, and as such are much less expensive than a comparable sized solid wood finger joint blank. O.S.B. also has a particularly high tensile strength and exterior resin that makes it desirable for many structural and exterior applications. In this manner, a material that is quite inexpensive can be used to provide a superior structurally sound and reliable finished product. The material for the substrate can be selected based upon the particular application of the final engineered moulding.

Reengineered Rip Saw

The production of a preferred embodiment of the composite panel form 50, according to preferred embodiments of this invention, has been described to this point. A reengineered rip saw or saw apparatus 90, shown in FIGS. 12A and 12B, converts each composite panel form into a plurality of engineered blanks or engineered mouldings 56 (multiples). The reengineered rip saw includes an arbor holding a number of moulder heads that cut the composite panel form into a variety of engineered mouldings depending upon certain prescribed dimensions of the cutting tools. These prescribed dimensions of cutting tools include such parameters as the number of moulder heads, number of knives, number of cutter elements as described below, size of saws, number of engineered mouldings formed from each composite panel form, horsepower, RPM speed of the cutters, feed speeds of the component panel forms, etc. These prescribed dimensions are design choices that depend upon such considerations as the type of wood and substrate used in the formed moulding, the size of the moulding, and similar factors. These specifics are not detailed herein, but normal formulas and techniques applied to standard moulding machine applications may be applied, and are within the normal working knowledge of experienced saw designers. Though the described preferred embodiment cuts multiple engineered mouldings from a single engineered composite panel form, the reengineered rip saw may also be applied to cut, mould, and contour multiple lineal pieces of the same size and profile or a variety of sizes and profiles of parallel mouldings from a wide engineered finger joint and edge-glued blank. Normally, rip saws are much wider than 12-inches and are usually able to rip product 24-inches to as much as 60-inches wide. Mouldings much wider than can be made on any other moulder can be easily made on a reengineered rip saw. The reengineered rip saw machining uniform solid clear wood blanks or finger joint blanks is also within the intended scope of the present invention.

Figures 12A, 12B:
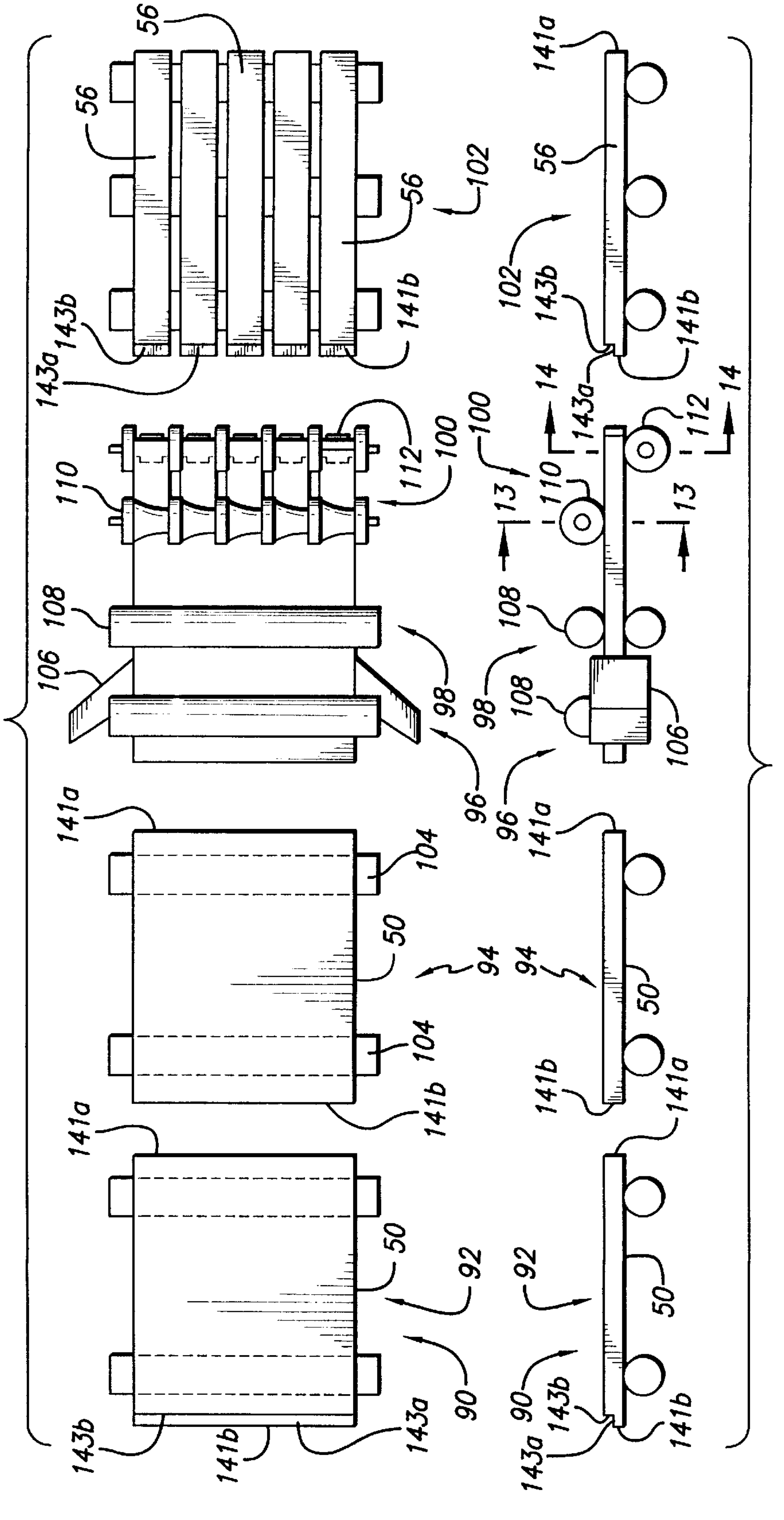
FIG. 12A is a top plan view illustrating the cutting apparatus that forms a preferred embodiment of engineered moulding from the FIG. 8A composite panel form.
FIG. 12B is a side elevational view of the FIG. 12A cutting apparatus.

The reengineered rip saw 90, illustrated in top plan view in FIG. 12A and in side elevational view in FIG. 12B, includes an infeed supply section 92, a transport roller section 94, a guide section 96, a hold down and infeed section 98, a cutting section 100, and an exit section 102. The infeed supply section 92 contains composite panel forms 50 arranged so that one composite panel form after another can automatically be fed into the transport roller section 94. The transport roller section 94 includes transport rollers 104 that continually rotate to feed the composite workpiece to the guide section and the hold down section.

The guide section 96 consists of measuring, indexing and line up apparatus besides a plurality of spaced guides or fences 106 that deflect the composite panel form 50 laterally, if necessary, into the correct position. The hold down and infeed section 98 includes hold down rollers 108 and/or hold down guides (not illustrated) positioned above and below the path of the composite panel form, which securely contact each composite panel form as they travel to the cutting section 100. The hold down rollers 108 are preferably motorized to drive the composite panel form through the cutting section. The hold down guides do not need to rotate but are generally contoured to the shape of the composite panel form (such as including contours for rabbet joints or rabbet grooves). The hold down guides may be used in addition to, or in replacement of, hold down rollers. The use of hold down guides is well known in the wood working art. The hold down guides can precisely position the composite panel form laterally relative to the reengineered rip saw. The use of fences, hold down rollers, and bold down guides improve tolerances of the engineered moulding 56 by respectively reducing waver and flutter of the composite panel forms during cutting within the cutting section. Fences, hold down guides and hold down rollers may also be integrated into the cutting section to further limit waver and flutter during the cutting process and to aid in the feed through aspects of moving the moulded lineal product through the reengineered rip saw. Precisely controlling the position of the composite panel form within the cutting section ensures close tolerances of the engineered moulding. The exit section 102 removes the engineered blanks or the finished engineered mouldings 56 formed by the cutting section 100.

The cutting section 100 includes an upper cutter element 110 and a lower cutter element 112. There is only need for one upper cutter element and one lower cutter element illustrated in FIG. 12 and 13 for most profiles of household construction mouldings. If the desired engineered moulding 56 is especially complex or large, multiple upper cutter elements or multiple lower cutter elements may replace a single cutter element. Each cutter element then carries cutter heads that hold some cutter knife blades. Since the upper cutter element is spaced along the cutting path from the lower cutter element, it is important that close dimensional tolerances be maintained so that the lower cutter element is accurately positioned relative to cuts already made to the engineered moulding from the upper cutter element. Although laterally spaced fences 106, the hold down guides, and the hold down rollers 108 improve relative positioning between the upper and the lower cutter elements, some embodiments of the present invention additionally use a laser tracking and displacement section or preformed guides to ensure close conformation of the profiles being produced by each successive cutter element with the desired contour shape of the engineered blank, at that point. The laser tracking or preformed guides can align each successive cutter element with the cuts applied to the composite panel form by previous cutter element(s). In laser tracking devices, which are commonly used in the sawmill industry, a laser measures the alignment to a desired reference machined surface. If the machined surface from the upper cutter element is displaced from the current lateral position at which the lower cutter element is cutting, the operator is alerted to readjust the mechanical hold down guides and preformed alignment fences so that the lower cutter elements are displaced relative to the axial cuts previously made to the workpiece to provide the properly aligned cut.

Figure 13:
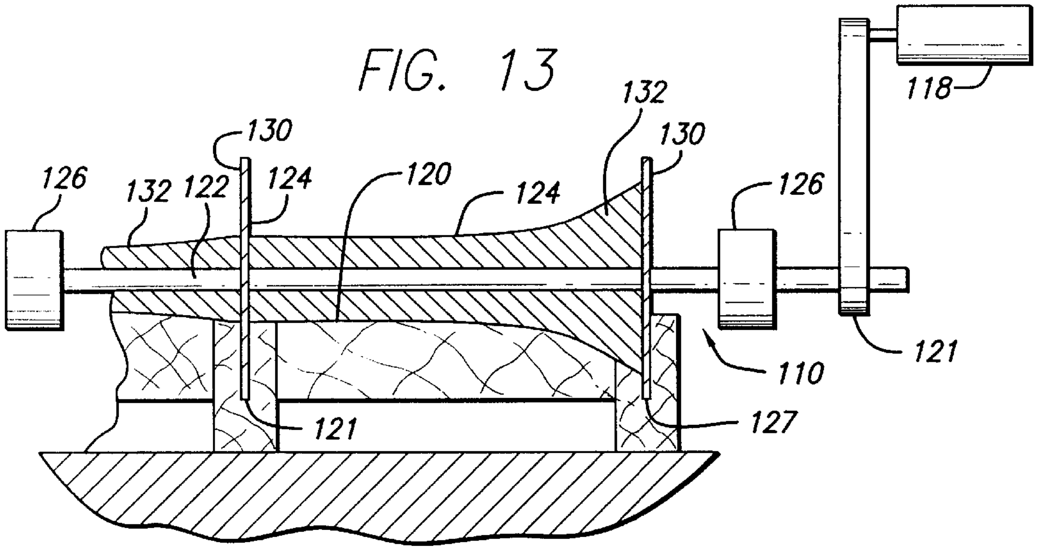
FIG. 13 is a cross sectional elevational end view as taken along section lines 13—13 of FIG. 12B.
Figure 14:
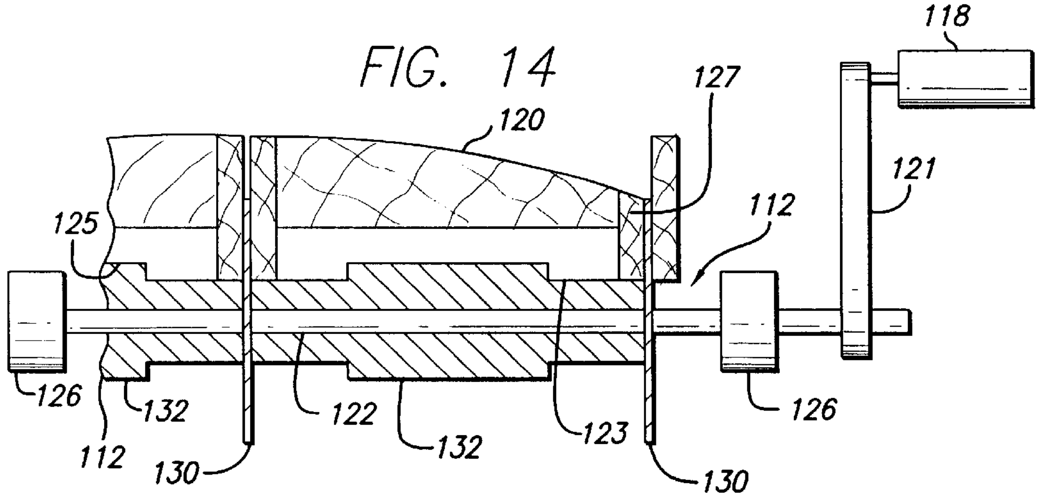
FIG. 14 is a cross sectional elevational end view as taken along section lines 14—14 of FIG. 12B.

FIG. 13 illustrates an end elevational view of the upper cutter element 110 cutting the composite panel form 50, as taken in cross section along section lines 13—13 of FIG. 12A. FIG. 14 illustrates an end elevational view of the lower cutter element 112 cutting the composite panel form, taken in cross section along section lines 14—14 of FIG. 12A, to form a plurality of engineered mouldings 56. FIGS. 13 and 14 show how the contour of the upper cutter element and the lower cutter element combine to define the entire outline of the engineered moulding 56. In effect, the upper cutter element shapes the surface of an upper portion 120 of the engineered moulding (see FIG. 13). A bottom interconnection 121 of the composite moulding is still intact after the upper cutter element shapes the upper portion. The lower cutter element then shapes the surface of a lower portion 123 of the engineered moulding plus cuts away the bottom interconnection as shown in FIG. 14. Junction points 127 of FIG. 14 distinguishes the surface formed primarily by the upper cutter element 110 from the surface formed primarily by the lower cutter element 112. In this disclosure, the order of the cuts by the upper and lower cutting elements is irrelevant. It is important, though, that the latter cutter elements are properly laterally and vertically aligned with the cuts produced by the prior cutter elements. An up/down adjustment (not shown), more precisely geared for precision moulding, is provided to selectively move the arbor 122 up or down a prescribed and controllable distance. As the arbor moves up or down, so do the cutter elements, which control the combined depth of cut of all of the cutter elements on that arbor into the workpiece.

The upper cutter element 110 and the lower cutter element are each preferably formed as a modified moulder cutter head to slide onto and attach to form a portion of the reengineered rip saw. In the past, rip saws have gained the reputation of being low tolerance, but inexpensive, cutting devices. By comparison, moulders are close tolerance, but expensive, cutting devices. Modifying rip saw technology to achieve comparable tolerances to moulders represents a major design feature of certain preferred embodiments of the present invention. While using moulders to form mouldings having complex curves may be desirable, the reengineered rip saw mechanism described herein can be applied to mouldings with complex curves, mouldings with routine curves, and also to rectangular mouldings. It is envisioned that these latter two categories of mouldings account for more than 85 percent of the mouldings produced. The vast difference in cost between moulders and reengineered rip saws makes it very attractive to use reengineered rip saws to form moulding whenever possible. The element of operating cost related to units of production of lineal moulding output for labor, power and tooling costs favor the use of the reengineered rip saw over the prior art moulders, band saws, and planers.

The elements of the upper cutter element 110 of the reengineered rip saw 90 are now described. Similar structures and principles are used in both the upper cutter element 110 and the lower cutter element 112. The upper cutter element includes a motor 118, a drive mechanism 121, an up/down adjustable arbor 122, at least one cutting blade 124, and a plurality of bearings 126. The motor and drive mechanism are well known in the sawmill industry. However, the reengineered rip saw is configured to generally carry more and/or wider cutting heads containing cutting tools and blades on each cutter element than prior art one, or multiple, straight saw blade through-cut rip saws. This is because many cutting tools and blade faces may be used to shape the engineered moulding 56 and also cut between adjacent engineered mouldings formed from the same composite panel form 50. The wider surface of cutting tools and blades of the cutter elements 110, 112 also demand a more powerful motor and drive arrangement, a larger and more adjustable arbor, and stronger more precise tolerance bearings 126 than prior art rip saws. Therefore, the horsepower of the motor preferably is increased, compared with conventional rip saws, to compensate for more, and wider, cutting tools. Two or more arbors that carry some cutting tools and blades may have to be applied to provide the multiple cuts for out of the ordinary and more complex profile shapes required in the preferred embodiment. The cutting tools and blades are non-rotatably affixed to the arbor using hydrolocking self-centering cutting heads wherein the cutting tools and blades are contained. The reengineered rip saw can achieve closer tolerances than prior art rip saws used in industry due to the addition of heavier and more precise machine guides, hold downs, and tracking arrangements.

As illustrated in FIG. 8A, the composite panel form may be relatively wide since multiples of engineered mouldings 56 are machined therefrom in a parallel manner. It is preferable that the upper cutter element 110 and the lower cutter element 112 both are at least as wide as the composite panel form to provide a complete one-pass execution of the profile shape. The entire upper portion and the entire lower portion of each engineered moulding can thereby be formed from the same respective upper cutter element and lower cutter element pair. This consistency of circumference and concentricity of depth of cut of upper and lower cutter elements makes the cuts applied to the engineered mouldings more uniform and results in smooth moulder machine surface quality.

As illustrated in FIGS. 13 and 14, there are two major distinct types of cutting tools and blades: vertical cutting blades 130 and horizontal contour cutting blades 132. The function of the vertical cutting blades is to cut at least a portion of one vertical edge of the final machined engineered moulding 56 as illustrated in FIG. 14. In the preferred embodiment, vertical cutting blade 130 on the upper cutter element 110 has a mating vertical cutting blade on the lower cutter element 112. The vertical cutting blade 130 on the upper cutter element must cut down to a level that is at least as low as a level that the vertical cutting blade on the lower cutter element cuts up to (preferably there is some overlap between the levels that the lower and the upper cutter elements cut to). The mating vertical cutting blades of the upper cutting element and the lower cutter element therefore removes all interconnecting wood 135 between the adjacent engineered mouldings.

The horizontal contour cutting tools and blade 132 shown in FIGS. 13 and 14 form the contoured surfaces 137 of the engineered moulding that are not vertical edges 134. The horizontal contour cutting tool blades that are part of the upper cutter element 110 contour the upper portion 120 of the engineered moulding. The horizontal contour cutting tool blades that are part of the lower cutter element 112 contour a lower portion 122 of the engineered moulding. Though FIGS. 13 and 14 show all of the vertical cutting blades 130 and all of the horizontal contour cutting blades 132 as being located on two cutter arbor elements, it is possible to provide a different number of cutter elements having different blade configurations, etc. Therefore, one reengineered rip saw is capable of performing the production of a variety of prior art moulders, rip saws, band saws, and planers that operate lineally to form mouldings.

One advantage of cutting a composite panel form 50 comprising a substrate 62 formed from particle board, O.S.B., M.D.F. (or another substrate that is not formed from discrete solid wood, or is formed from inferior core quality wood) is that there is less possibility that wood sections cut by vertical cutting blades 130 will move relatively, or distort their shape, or warp during the cutting process. When a discrete wood section is cut, by comparison, the two cut portions tend to move or warp with respect to each other since there are considerable natural stresses present in discrete natural wood pieces. These natural stresses generally increase with the size of the discrete wood piece due to the grain directions or other natural characteristics of the wood. The overlaying of the non-discrete wood sections, with the grain directions of the different overlays oriented in different directions in the preferred embodiments of the present invention, tends to cancel these natural wood stresses. This movement of relative cut sections with respect to each other becomes a greater problem in the saw apparatus 90 of FIGS. 12A and 12B when cutting a composite panel form formed from discrete solid wood instead of a composite panel form including a nondiscrete wood substrate. This is because the multiple cutter elements 110, 112 of the cutting apparatus 90 do not cut simultaneously. It is more difficult for the latter cutter elements to align their cutting blades with the cut multiple sections from the upper cutter element when cutting discrete solid wood sections due to the stresses in the discrete wood sections as compared with substrates of the type described in the present invention, and the resultant relative motion between the cut wood sections as the product moves lineally through the reengineered rip saw. The natural tendency of solid wood to distort when partially or fully ripped or cut reduces the ability to align multiple cuts of top and bottom arbors as solid wood products cut in multiples of profiles in prior art systems.

Another advantage of using the reengineered rip saw as described below results from the multiple lineal lengths of moulding (referred to herein as "multiples") that are cut in parallel. If it is desired to cut many pieces of wood of the same length and having the same dado configurations, then the composite panel form 50 can be precision end trimmed and/or dado trimmed before feeding the composite form into the reengineered rip saw. Therefore, when the composite panel forms are cut into multiples using the reengineered rip saw, each resultant engineered moulding formed has the same dado cuts and/or precision end trim cuts. Being able to cut multiples from one composite form having nearly identical precision end trim cuts or dado cuts becomes especially desirable when producing such high-volume, similar dimensional, and close tolerance items such as door jambs. The operator of the reengineered rip saw only has to make the measurements for the cross cuts or the dado cuts once for all of the engineered mouldings formed from a single composite form, providing that they are all intended to be cut the same length. This compares with the prior art moulding and dado machines in which distinct measurements and continuous individual handling is required for each piece of moulding. The ability to accurately measure, cross cut, and dado cut multiples simultaneously saves considerable operator time and the associated expenses. FIG. 12A and 12B illustrate a variety of dado cuts and precision end trim cuts. For example, the leftmost composite panel form 50 as illustrated in FIGS. 12A and 12B, as well as the finished engineered mouldings 56, have both precision end trim cuts, on both ends, providing surfaces 141*a* and 141*b*, and a dado cut providing surfaces 143*a* and 143*b*. By comparison, the composite panel form that is second from the left in FIGS. 12A and 12B has only the precision end cut surfaces 141*a* and 141*b*.

Figure 15:
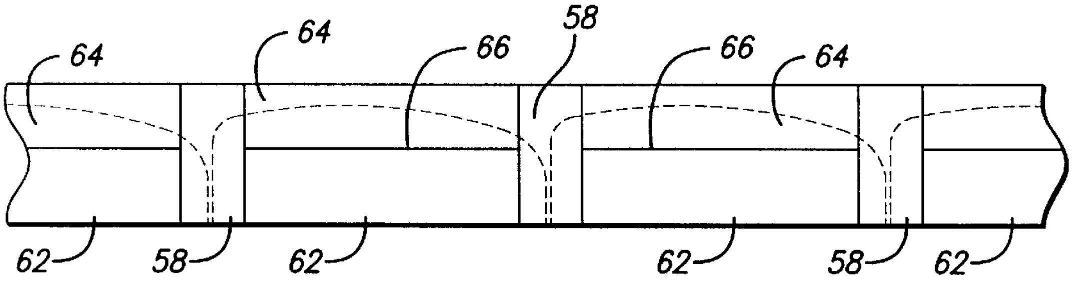
FIG. 15 is a cross sectional view of one embodiment of composite panel form, illustrating cuts that define one embodiment of engineered moulding of the present invention.
Figure 16:
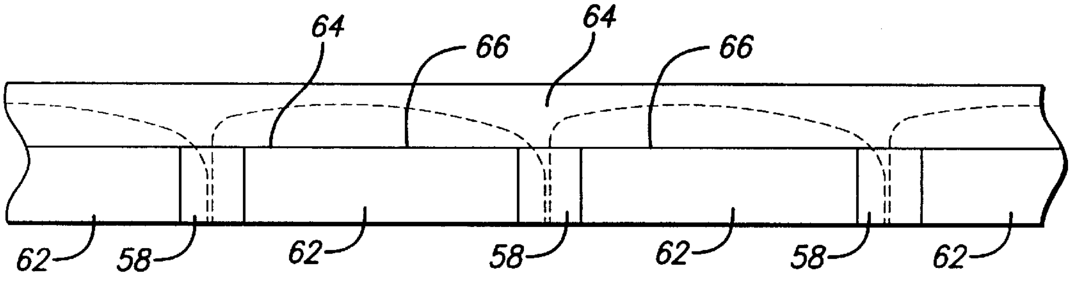
FIG. 16 is a cross sectional view of another embodiment of composite panel form from FIG. 15, illustrating cuts that define another embodiment of engineered moulding of the present invention.

FIGS. 15 and 16 each illustrates a different embodiment of composite panel form of the present invention. FIG. 16 illustrates a view similar to that of FIG. 15 except that the edge boards and the machinable veneers of the composite panel form are arranged in a different configuration. In FIG. 16, the machinable veneer 64 is continuous, although it may be formed from several elements, and extends along the entire upper surface of the composite panel form 50. Both the substrate and the end boards alternatively contact a lower surface of the machinable veneer. In FIG. 15, by comparison, the lower surface of the machinable veneer only contacts the substrate, and the combined veneer/substrate alternates horizontally with the edge boards 58. The choice of whether a FIGS. 15 or 16 composite panel form configuration is preferred depends upon the specifics of the assembling and forming the composite panel form, and is a design choice. The dotted lines in FIGS. 15 and 16 illustrate an example of the final cuts that are provided by the reengineered rip saw of the present invention to form the engineered mouldings.

Although the invention has been described in detail with reference only to certain exemplary embodiments, those skilled in the art will appreciate that various modifications can be made without departing from the invention. For example, even though this disclosure largely describes a preferred embodiment of forming a plurality of engineered lineal mouldings from a composite panel form, it is envisioned that more conventional and homogenous types of mouldings may also be formed from a single piece of wood or another composite structure, using the reengineered rip saw described herein. Additionally, differently shaped mouldings that are within the scope of the claims, but are not specifically set forth in the disclosure, are intended to be within the scope of the present invention. Accordingly, the invention is defined only by the following claims.

What is claimed is:

1. A continuous and unified production process of forming a plurality of similar engineered mouldings each of which has a greater resistance to warping and splitting as compared to a uniform piece of solid wood of a similar size and shape, the method comprising the steps of:

providing a plurality of similar elongated axially extending edge boards of rectangular cross-section, a plurality of similar elongated axially extending substrates of rectangular cross-section that are of a different material than the edge boards and at least one flat sheet of a machinable wood veneer;

positioning and adhering the edge boards parallel to each other between the substrates, thus forming a pattern of alternating edge boards and substrates, adhering the edge boards to the adjacent substrates, and positioning and adhering the veneer so as to overlay a planar surface formed by the edge boards and the substrates; and as part of the same production process, cutting through the composite panel thus formed at a plurality of regularly spaced locations so as to cut the edge boards in a parallel lengthwise manner, whereby a plurality of similar engineered mouldings of substantially the same dimensions are formed, each such moulding comprising at least a portion of one substrate, at least a portion of at least one adjacent adhered edge board, and an associated adhered portion of the machinable wood veneer.

2. The process as defined in claim 1, wherein the step of cutting through the composite panel is performed by cutting the edge boards simultaneously at a plurality of locations.

3. The process as defined in claim 1, wherein the edge boards are formed of solid wood.

4. The process as defined in claim 1, wherein the substrates are formed of composite board.

5. The process as defined in claim 1, wherein:

the edge boards are formed of solid wood; and the substrates are formed of composite board.

6. The process as defined in claim 1, wherein the substrates are formed of particle board, medium density fiberboard or oriented strand board.

7. The process as defined in claim 1, comprising the further step of contouring the veneer by removing material therefrom.

8. The process as defined in claim 7, wherein the step of contouring the veneer is carried out after the composite panel has been formed.

9. The process as defined in claim 7, wherein the step of contouring the veneer is carried out by removing material with a moulder knife.

10. The process as defined in claim 7, wherein the step of contouring is carried out by moving a cutting tool in a direction parallel to the edge boards.

11. The process as defined in claim 10, wherein the cutting tool is a moulder knife.

12. The process as defined in claim 1, wherein the composite panel is cut in such a manner that each moulding thus formed includes portions of two edge boards.

13. The process as defined in claim 1, comprising the further step of contouring the veneer by removing material therefrom, the step of contouring the veneer and the step of cutting through the composite panel being carried out simultaneously.

14. The process as defined in claim 13, wherein the step of cutting through the composite panel is performed by cutting the panel simultaneously at a plurality of locations.

15. The process as defined in claim 13, wherein both the cutting and contouring steps are performed by a rip saw having a plurality of parallel rip saw blades and a plurality of moulder heads between the rip saw blades.

16. The process as defined in claim 1, wherein:

the edge boards are formed of solid wood and the substrates are formed of composite board; and the step of cutting through the composite panel is performed by cutting the panel simultaneously at a plurality of locations.

17. The process as defined in claim 16, comprising the further step of contouring the veneer by removing material therefrom.

18. The process as defined in claim 16, comprising the further step of contouring the veneer by removing material therefrom with a moulder head, the step of contouring the veneer and the step of cutting through the composite panel being carried out simultaneously.

19. The process as defined in claim 1, wherein the composite panel is moved linearly to cause cutting of the edge boards during the cutting step.

20. The process as defined in claim 19, wherein the step of cutting through the composite panel is performed by cutting the edge boards simultaneously at a plurality of locations.

* * * * *